US005377099A

United States Patent [19]

Miyagawa

[11] Patent Number: 5,377,099

[45] Date of Patent: Dec. 27, 1994

[54] ELECTRONIC VOTING SYSTEM INCLUDING ELECTION TERMINAL APPARATUS

[75] Inventor: Takayoshi Miyagawa, Tokyo, Japan

[73] Assignee: The Center for Political Public Relations, Inc., Tokyo, Japan

[21] Appl. No.: 12,760

[22] Filed: Feb. 3, 1993

[30] Foreign Application Priority Data

Jul. 6, 1992 [JP] Japan .................................. 4-178686

[51] Int. Cl.[5] ........................ G06F 15/21; G06F 15/74

[52] U.S. Cl. ........................................ 364/409; 235/386

[58] Field of Search ............. 364/409, 401; 235/50 R, 235/50 A, 50 B, 54 F, 51, 386; 345/173, 174, 175, 183; 382/1, 11, 13

[56] References Cited

U.S. PATENT DOCUMENTS

| | | | |
|---|---|---|---|
| 3,779,453 | 12/1973 | Kirby et al. | 235/54 F |
| 4,010,353 | 3/1977 | Moldovan, Jr. et al. | 235/54 F |
| 4,015,106 | 3/1977 | De Phillipo | 235/54 F |
| 4,093,849 | 6/1978 | Baxter, Jr. et al. | 364/413.08 |
| 4,168,469 | 9/1979 | Parikh et al. | 364/900 |
| 4,373,134 | 2/1983 | Grace et al. | 235/386 |
| 4,736,307 | 4/1988 | Salb | 364/413.05 |
| 4,747,060 | 5/1988 | Sears, III et al. | 364/422 |
| 4,751,648 | 6/1988 | Sears, III et al. | 364/422 |
| 4,778,449 | 10/1988 | Weber et al. | 604/65 |
| 4,791,570 | 12/1988 | Sherman et al. | 364/436 |
| 4,838,275 | 6/1989 | Lee | 128/904 |
| 4,882,704 | 11/1989 | Komori et al. | 364/900 |
| 4,882,705 | 11/1989 | Yasue | 364/900 |
| 4,902,948 | 2/1990 | Sherman et al. | 318/580 |
| 4,935,608 | 6/1990 | Tanaka | 364/405 |
| 5,063,600 | 11/1991 | Norwood | 382/13 |
| 5,133,076 | 7/1992 | Hawkins et al. . | |
| 5,189,288 | 2/1993 | Anno et al. | 364/409 |
| 5,218,528 | 6/1993 | Wise et al. | 364/409 |

*Primary Examiner*—Robert A. Weinhardt

*Attorney, Agent, or Firm*—Oblon, Spivak, McClelland, Maier & Neustadt

[57] ABSTRACT

An election terminal apparatus incorporates a storage unit, a coordinate input unit and a two-dimensional display unit which is interlocked with the coordinate input unit. When voting is to be performed, the election terminal apparatus directly or indirectly displays candidate names or party names on the display unit, thus urging a voter to perform a selecting operation. When the voter selects a candidate by using the coordinate input unit, the election terminal apparatus displays the attribute of the selected candidate and urges the voter to perform a confirming operation to confirm a final decision. When the voter performs a confirming operation, the vote count data registered in the storage unit is updated.

22 Claims, 16 Drawing Sheets

REGION DATA BUFFER 29

| SCREEN PAGE | REGION DATA | ATTRIBUTE | DESTINATION FOR PROCESSING |
|---|---|---|---|
| 1 | (X01, Y01–X02, Y02) | NON-HANDWRITING | SCREEN PAGE 2 |
| | (X11, Y11–X12, Y12) | NON-HANDWRITING | SCREEN PAGE 4 |
| 2 | (Xa1, Ya1–Xa2, Ya2) | NON-HANDWRITING | CANDIDATE NUMBER 01 SCREEN PAGE 3 |
| | (Xb1, Yb1–Xb2, Yb2) | NON-HANDWRITING | CANDIDATE NUMBER 02 SCREEN PAGE 3 |
| | (Xc1, Yc1–Xc2, Yc2) | NON-HANDWRITING | CANDIDATE NUMBER 03 SCREEN PAGE 3 |
| | ⋮ | ⋮ | ⋮ |
| 3 | (Xd1, Yd1–Xd2, Yd2) | NON-HANDWRITING | SCREEN PAGE 1 |
| | (Xe1, Ye1–Xe2, Ye2) | NON-HANDWRITING | SCREEN PAGE 2 |
| | (Xf1, Yf1–Xf2, Yf2) | ——— | ——— |
| 4 | (Xg1, Yg1 Xg2, Yg2) | HANDWRITING | ——— |
| | (Xh1, Yh1–Xh2, Yh2) | HANDWRITING | ——— |
| | (Xi1, Yi1–Xi2, Yi2) | NON-HANDWRITING | SCREEN PAGE 5 |
| | (Xj1, Yj1–Xj2, Yj2) | NON-HANDWRITING | SCREEN PAGE 4 |
| 5 | (Xk1, Yk1–Xk2, Yk2) | NON-HANDWRITING | SCREEN PAGE 1 |
| | (Xm1, Ym1–Xm2, Ym2) | NON-HANDWRITING | SCREEN PAGE 4 |
| | (Xn1, Yn1–Xn2, Yn2) | ——— | ——— |

F I G. 8

SCREEN PAGE OUTPUT BUFFER 32

| SCREEN PAGE | OUTPUT DATA | ATTRIBUTE |
|---|---|---|
| 1 | PLEASE DESIGNATE ONE OF VOTING MODES WITH ATTACHED PEN | GUIDANCE |
| | VOTING BY SELECTION | TEXT |
| | VOTING BY HANDWRITING | TEXT |
| | PLEASE DESIGNATE ONE OF VOTING MODES WITH ATTACHED PEN | SPEECH GUIDANCE |
| 2 | PLEASE DESIGNATE CANDIDATE NUMBER WITH PEN | GUIDANCE |
| | 15 14 13 ------ 03 02 01 | TEXT |
| | 30 29 28 ------ 18 17 16 | TEXT |
| | PLEASE DESIGNATE CANDIDATE NUMBER WITH PEN | SPEECH GUIDANCE |
| ⋮ | ⋮ | ⋮ |

F I G. 16

ELECTRONIC VOTING SYSTEM INCLUDING ELECTION TERMINAL APPARATUS

BACKGROUND OF THE INVENTION

1. Field of the Invention

The present invention relates to a computer terminal apparatus used for voting at an election, and an electronic system for voting at an election and totaling the votes cast.

2. Description of the Related Art

Conventionally, at presidential elections, elections of Diet members, and the like, voters go to polling stations, where the voters write candidate names on ballot papers and cast the ballot papers into ballot boxes. Thereafter, vote counting and totaling of election returns are manually performed.

As described above, in the conventional voting at elections, voting operations, totaling operations, and the like are not automated much. Therefore, it takes much time to perform voting and totaling operations. In addition, vote totaling errors often occur.

SUMMARY OF THE INVENTION

The present invention has been made in consideration of the above situation, and has as its object to provide a computer terminal apparatus and a computer system which can be used for voting and totaling operations and the like.

In order to achieve the above object, a computer terminal apparatus for elections according to the present invention uses a storage unit, a coordinate input unit, and a display unit which is interlocked with the coordinate input unit, and is characterized by having the following means:

(a) means for directly and/or indirectly displaying a list of candidate names and/or party names on the display unit, and urging a voter to perform a selecting operation;

(b) means for, when the voter selects a candidate and/or a party by using the coordinate input unit, displaying the attribute of the selected candidate and/or party, and urging the voter to perform a confirming operation to finally decide whether to vote for the candidate and/or party whose attribute is displayed; and (c) means for, when the voter performs a confirming operation, performing registration of a vote count in the storage unit or causing another unit connected to the storage unit by wire or radio means to perform registration of the vote count.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1.is a perspective view showing the outer appearance of an election terminal apparatus according to an embodiment of the present invention;

FIG. 8 is a view showing the structure of a region data buffer;

FIG. 16 is a view showing the arrangement of a screen page output buffer;

DETAILED DESCRIPTION OF THE PREFERRED EMBODIMENTS

Embodiments of the present invention will be described below with reference to the accompanying drawings.

Figure 1:
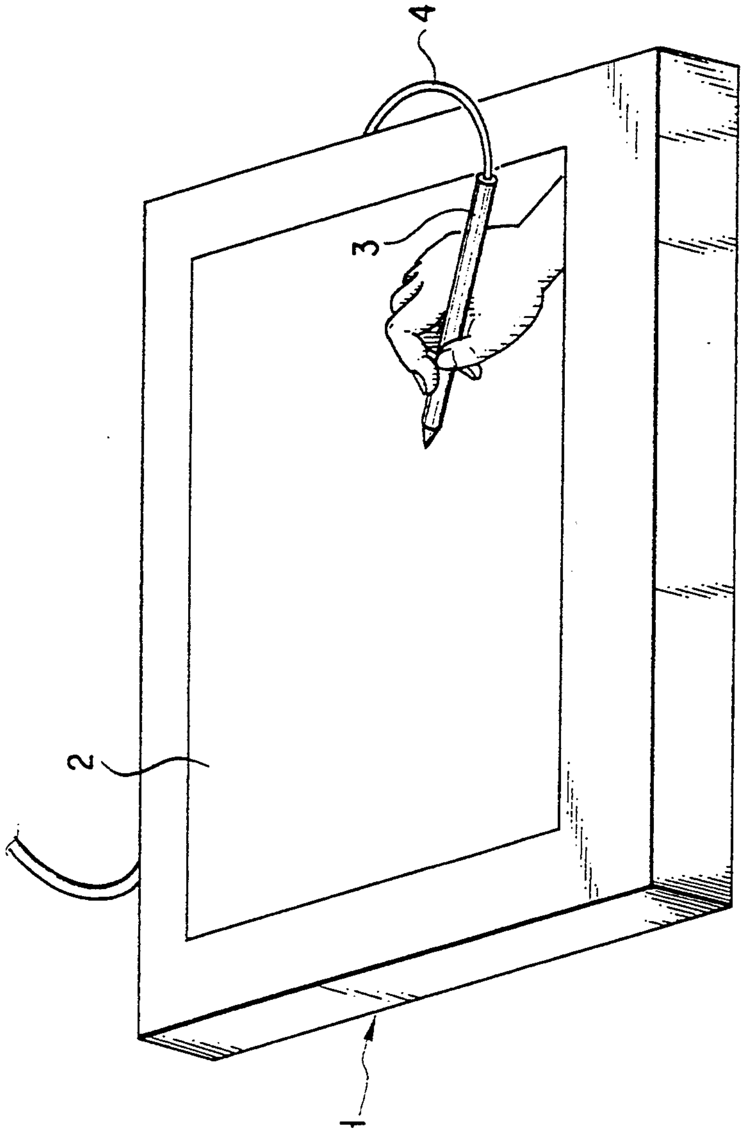

FIG. 1 shows the outer appearance of an election terminal apparatus according to this embodiment. Referring to FIG. 1, a display/input unit 2 is arranged on the upper surface of a casing 1. The display/input unit 2 is constituted by an LCD (liquid crystal display) and a transparent tablet stacked thereon and designed to input coordinates. The display/input unit 2 allows both display and input operations of data on the same coordinates. A pen (stylus) 3 serves to designate a coordinate position on the tablet. The pen 3 incorporates a switch for detecting the contact of the pen 3 with the tablet. The detection result obtained by this switch is informed to the internal circuit of the display/input unit 2 through a cord 4.

Figure 2:
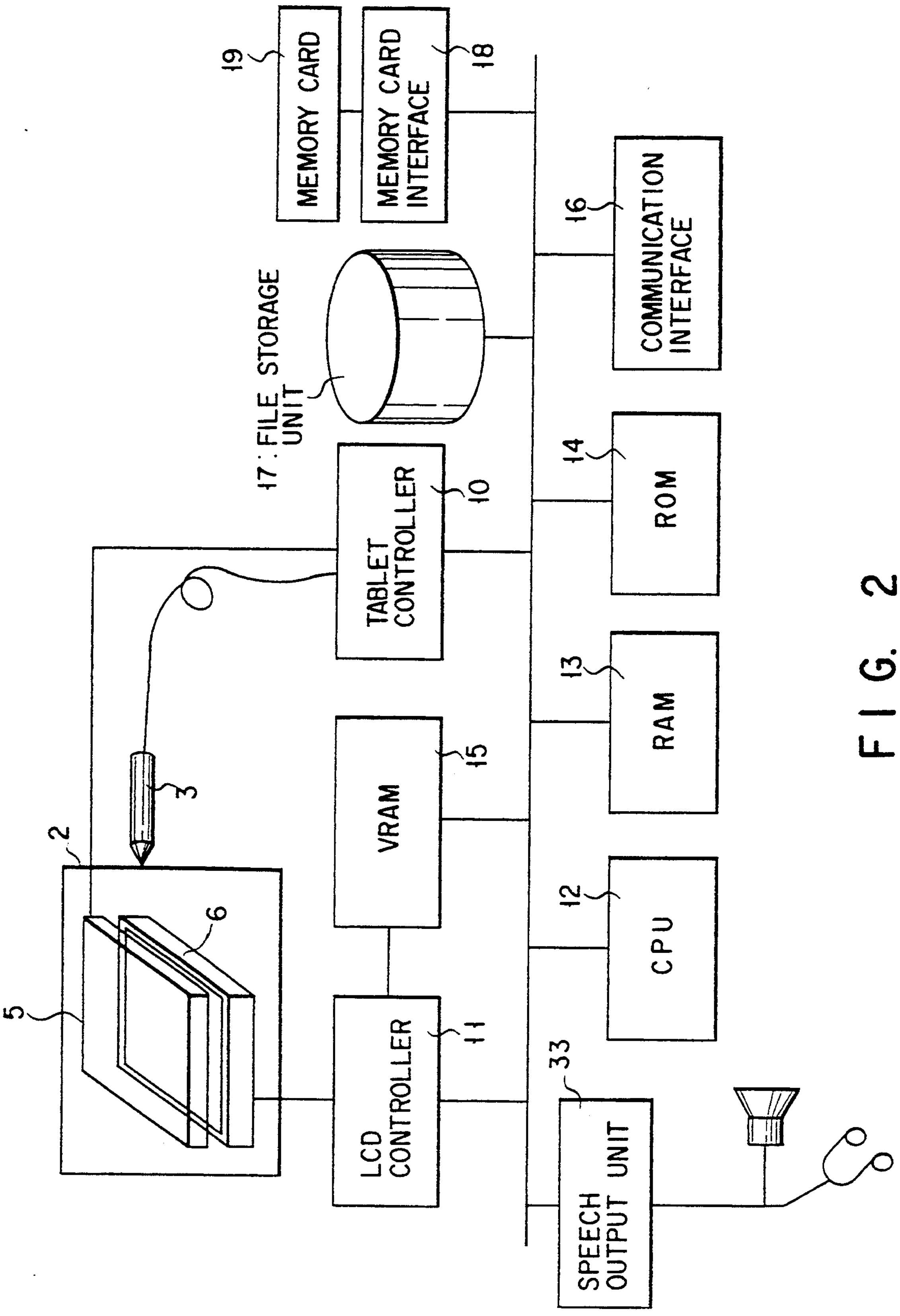
FIG. 2 is a block diagram showing the arrangement of the election terminal apparatus in FIG. 1.

FIG. 2 shows the hardware arrangement of the election terminal apparatus in FIG. 1. The display/input unit 2 is designed such that a transparent tablet 5 is stacked on an LCD 6. The transparent tablet 5 is designed such that transparent electrodes, respectively extending in orthogonal X and Y directions, are arranged on a glass plate in the form of a matrix. The transparent tablet 5 is controlled by a tablet controller 10 to detect X- and Y-coordinates designated by the pen 3. The LCD 6 is controlled by an LCD controller 11 to display images.

A CPU 12 is constituted by a microprocessor and the like and is designed to control the overall operation of this terminal apparatus. A RAM 13 is a memory capable of read/write operations and serves to store operation programs and data for the CPU 12. In addition, the RAM 13 stores information (e.g., display information and position information) associated with a software keyboard displayed on the LCD 6, information on the trace of the pen 3 (a pattern input by handwriting), and the like. A ROM 14 is a read-only memory for storing a diagnosis program which is used after the power switch of the terminal apparatus is turned on, a boot program used to start the system, and the like. A VRAM 15 is a bit map memory for storing image data defining an image to be displayed on the LCD 6.

The tablet controller 10 sequentially applies pulse voltages to the electrodes extending in the X direction and checks voltages at the electrodes extending in the Y direction. When the pen 3 designates a point on the transparent tablet 5, a pulse voltage applied to the X-direction electrode passing through the designated point is also applied to the Y-direction electrode passing through the point owing to electrostatic induction. While the switch in the pen 3 is in an ON state, the tablet controller 10 determines the coordinates of the point of intersection between the X-direction electrode, to which the pulse voltage is applied, and the Y-direction electrode, from which the pulse voltage is detected, as the X- and Y-coordinate data of the position designated by the pen 3, and transfers the obtained X- and Y-coordinate data to the RAM 13.

The LCD controller 11 controls transfer of image data from the VRAM 15 to the LCD 6, transfer of image data from the CPU 12 to the VRAM 15, and the like.

A communication interface 16 includes a communication unit of a wired or radio scheme and serves to exchange data with an external terminal control unit or a host computer.

A file storage unit 17 is constituted by, e.g., a HDD (hard disk drive) and the like and is designed to store dictionary data for character recognition, information associated with candidates, and the like. In addition, the file storage unit 17 saves information input by a voter. A memory card 19 is connected to a memory card interface 18. The memory card 19 stores an election application program for operating the terminal apparatus as a terminal for an election. This election application program is stored in the RAM 13 through the memory card interface 18 under the control of the CPU 12 when the system is started.

A speech output unit 33 informs a voter of the operating procedure of the terminal apparatus, candidate names, pieces of information about the candidates, and the like by speech through a speaker or a headphone speaker.

Figure 3:
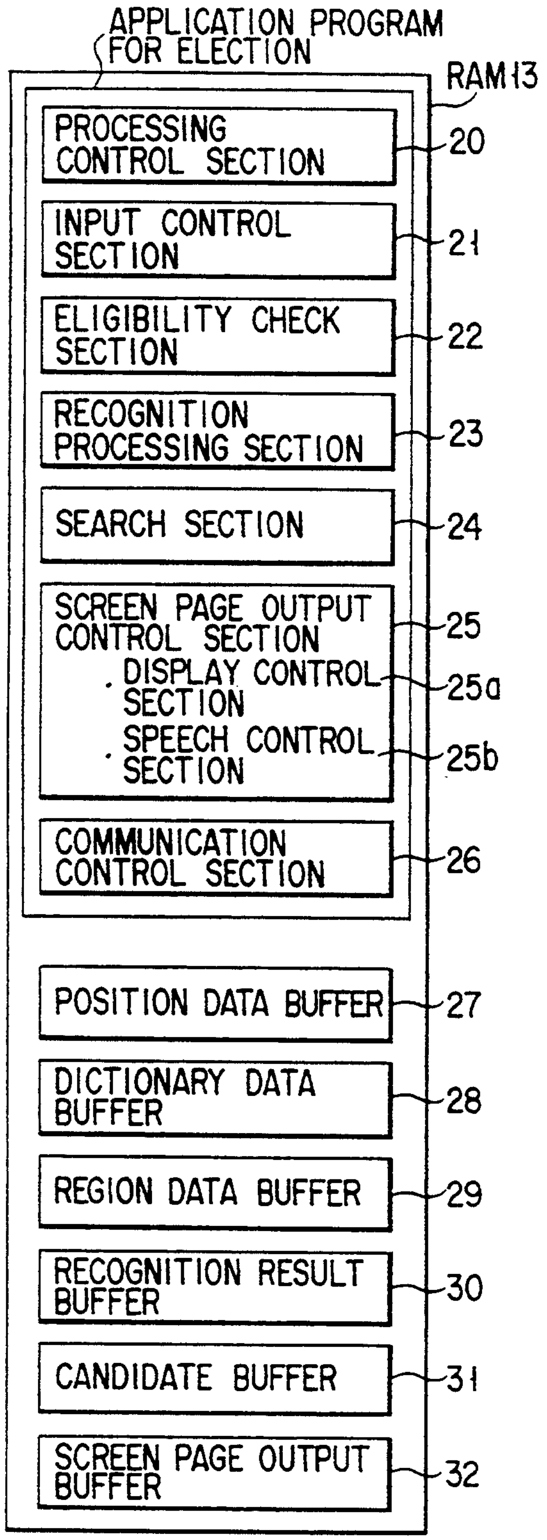
FIG. 3 is a view showing the structure of a control program and the structure of data buffers.

FIG. 3 shows the arrangement of the RAM 13. As described above, the RAM 13 stores the election application program transferred from the memory card 19. The election application program includes a processing control section 20, an input control section 21, an eligibility check section 22, a recognition processing section 23, a search section 24, a screen page output control section 25, and a communication control section 26. The RAM 13 further includes areas respectively serving as a position data buffer 27, a dictionary data buffer 28, a region data buffer 29, a recognition result buffer 30, a candidate buffer 31, and a screen page output buffer 32.

The processing control section 20 is a program for controlling the overall operation of the election application program. The coordinate data of the position, on the transparent tablet 5, designated by the pen 3 are supplied to the input control section 21 through the tablet controller 10.

The eligibility check section 22 serves to check the eligibility of a voter. For example, the eligibility check section 22 checks a person who has no right to vote but tries to vote or a voter who tries to vote a plurality of number of times. Upon detection of a non-eligible voter, the eligibility check section 22 instructs the CPU 12 to invalidate the voting operation of the voter.

When handwritten character recognition is designated, the recognition processing section 23 recognizes characters (numerals in this embodiment) written by a voter from a coordinate data sequence input from the input control section 21.

The search section 24 searches data associated with a candidate from the candidate buffer 31 on the basis of coordinate data supplied from the input control section 21 or characters recognized by the recognition processing section 23.

The screen page output control section 25 is constituted by a display control section **25*a* and a speech control section 25*b*. The display control section 25*a* has the following three functions: (1) transferring display data stored in the screen page output buffer 32 to the LCD 6 through the LCD controller 11; (2) displaying the trace of the pen 3 (characters, lines, and the like handwritten by a voter) on the LCD 6, in real time on the basis of coordinate data supplied from the input control section 21; and (3) causing the LCD 6 to display a command or icon for instructing an operation to be performed. The speech control section 25*b* supplies speech output data stored in the screen page output buffer 32 to a speech output unit 33**.

The communication control section 26 controls the communication interface 16 to perform data transmission control with respect to an external terminal control unit or the like. The position data buffer 27 stores coordinate data supplied from the input control section 21. The dictionary data buffer 28 stores dictionary data used for character recognition processing performed by the recognition processing section 23. The dictionary data is stored in the file storage unit 17 and is transferred therefrom to the dictionary data buffer 28 when the system is started.

Figure 9:
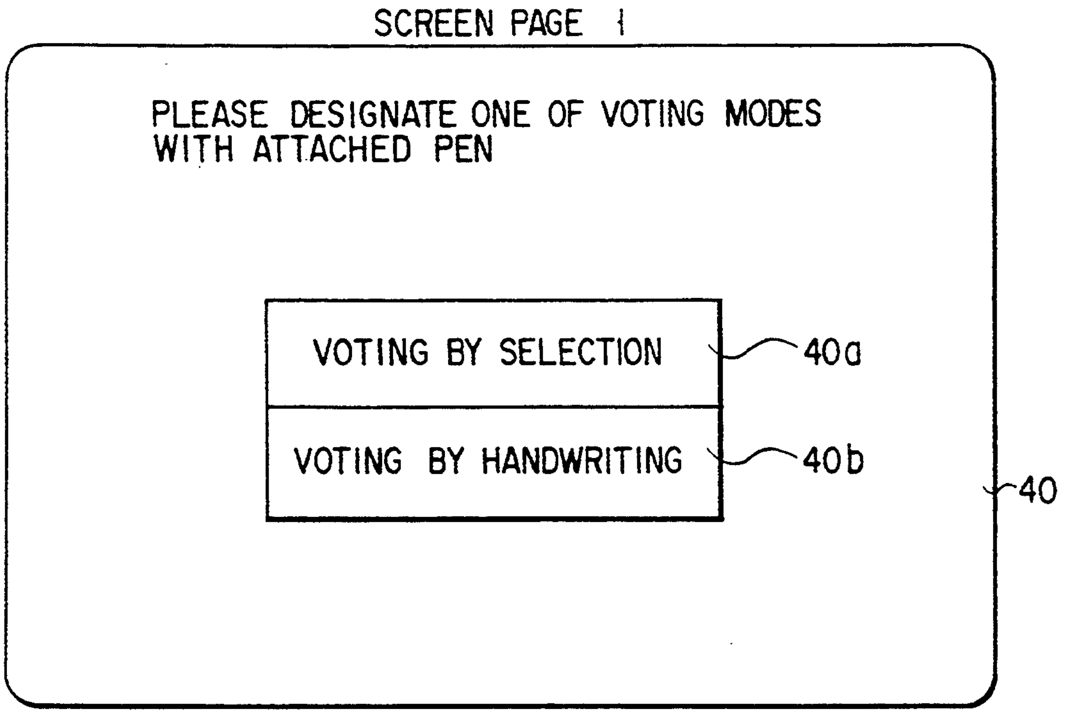
FIGS. 9 to 14 are views respectively showing examples displayed on the screen of the election terminal apparatus in FIG. 1.

The region data buffer 29 stores X- and Y-coordinate data indicating the display range of a graphic pattern (to be used for inputting data) displayed on the LCD 6, as shown in FIG. 8. The coordinates of the upper left corner and lower right corner of a "VOTING BY SELECTION" region **40*a* on the screen (screen page 1) shown in FIG. 9 are (X01,Y01) and (X02,Y02), respectively. If, therefore, coordinates detected by the tablet 5 come between the coordinates (X01,Y01) and (X02,Y02), it can be determined that the "VOTING BY SELECTION" region 40*a* is designated by the pen 3. The recognition result buffer 30 stores character data recognized by the recognition processing section 23**.

Figure 4:
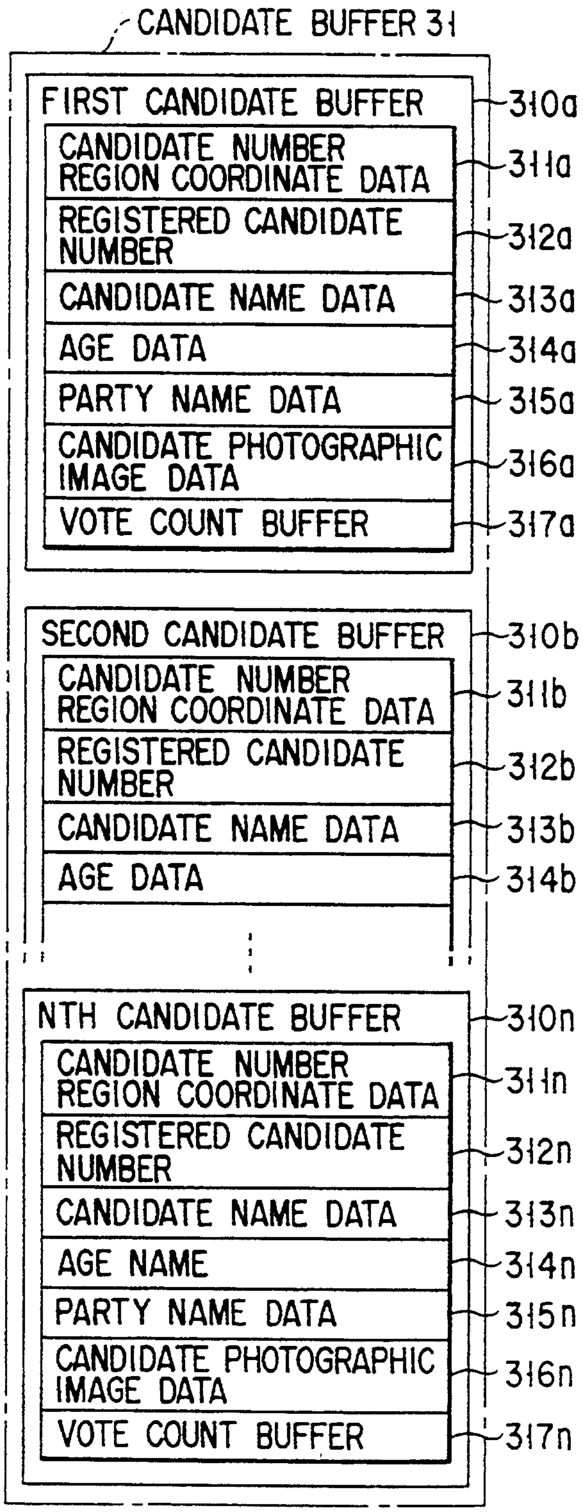
FIG. 4 is a view showing the structure of candidate buffers.

The candidate buffer 31 comprises candidate buffers **310*a* to 310*n* arranged for the respective candidates (a to n) to be managed by the election terminal apparatus, as shown in FIG. 4. Each of the candidate buffers 310*a* to 310*n*, as shown in FIG. 4, stores candidate number region coordinate data 311, a registered candidate number 312, candidate name data 313, age data 314, party name data 315, and candidate photographic image data 316, and includes a vote count buffer 317**.

The candidate number region coordinate data 311 is X- and Y-coordinate data indicating a region (icon) in which a corresponding registered candidate number is displayed on the screen shown in FIG. 10 (to be described later).

The registered candidate number 312 is an identification number assigned to each candidate. The party name data 315 indicates the name of a party to which each candidate belongs. The candidate photographic image data 316 is image data for a photograph of each candidate.

The vote count buffer 317 has a counter function. The count value of this counter is incremented by one every time a corresponding candidate receives a vote.

A voting method using the terminal apparatus will be briefly described below with reference to FIGS. 9 to 14.

When a voter is to operate the terminal, the screen shown in FIG. 9 is displayed on the LCD 6. The voter selects either "VOTING BY SELECTION" or "VOTING BY HANDWRITING" by using the pen 3. In "VOTING BY SELECTION", the voter votes by selecting the candidate number of a desired candidate from a plurality of numbers displayed on the LCD 6. In "VOTING BY HANDWRITING", the voter votes by writing the candidate number of a desired candidate on the tablet 5.

Figure 10:
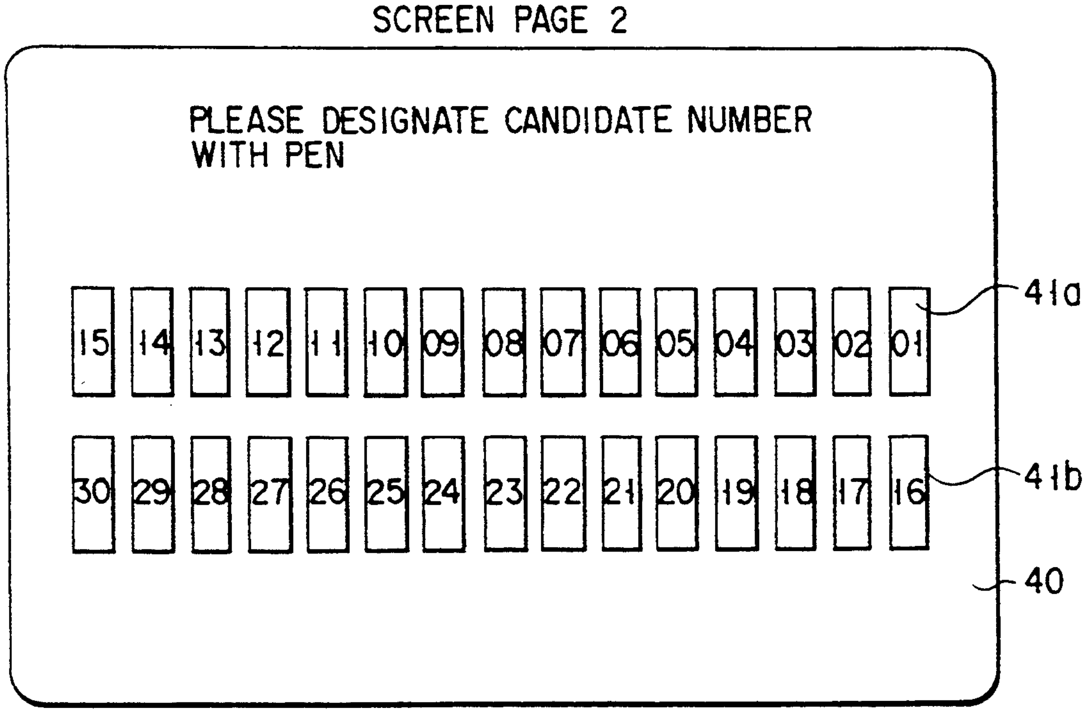
Figure 11:
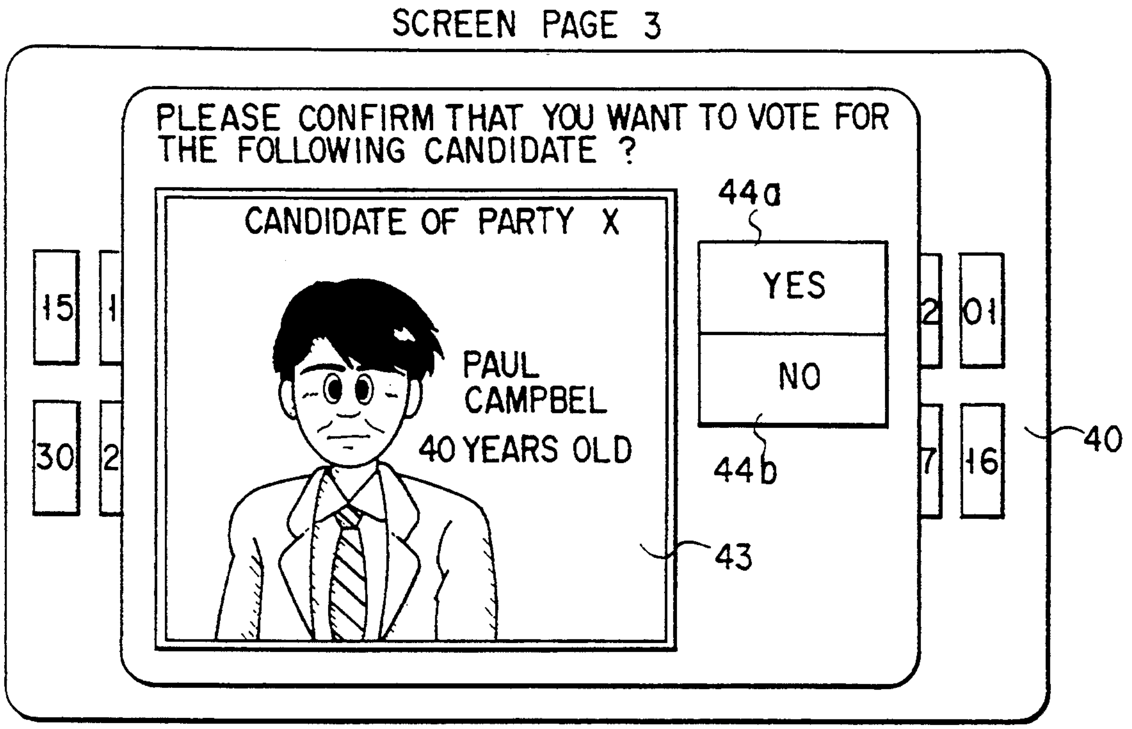

When the voter selects "VOTING BY SELECTION", the screen shown in FIG. 10 is displayed. The voter selects the candidate number of a desired candidate by using the pen 3. The screen shown in FIG. 11 is then displayed. When the voter wants to vote for the displayed candidate, he/she selects "YES". With the above operation, the processing of "VOTING BY SELECTION" is completed, and the screen shown in FIG. 9 is displayed again. If the voter selects "NO", the screen shown in FIG. 10 is displayed again.

Figure 12:
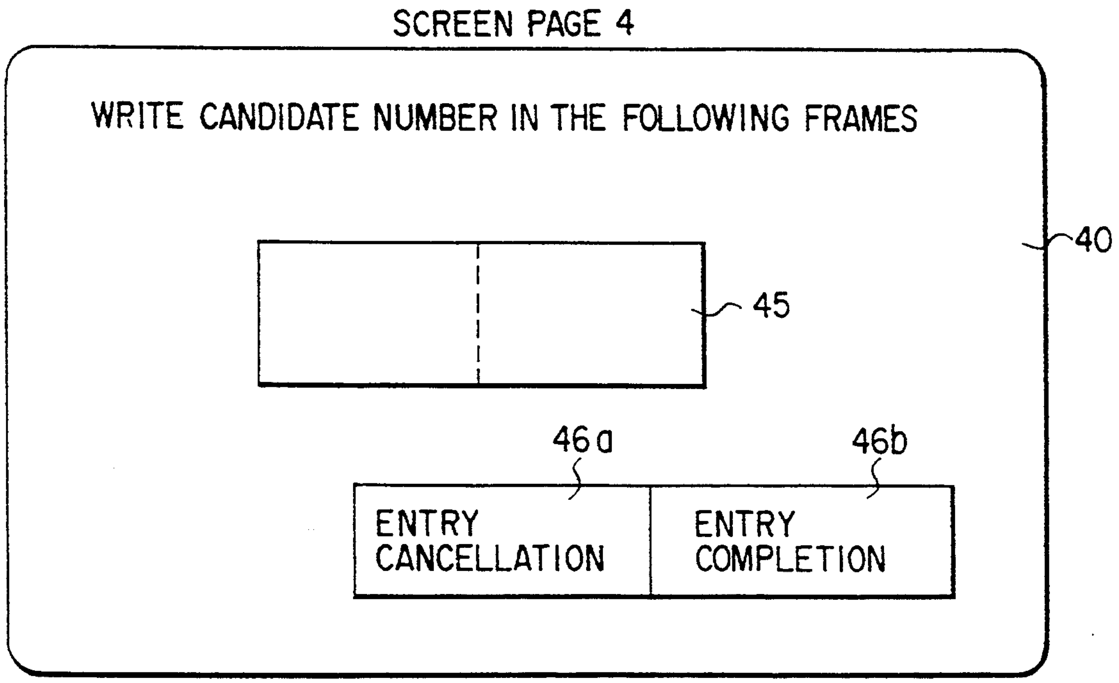
Figure 13:
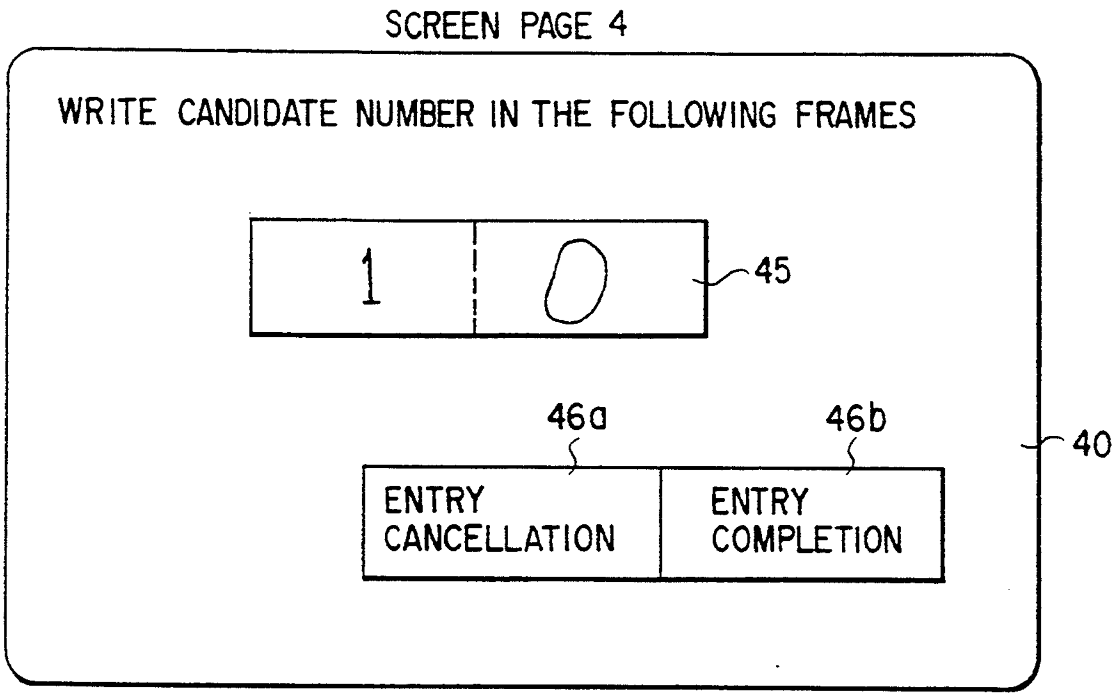
Figure 14:
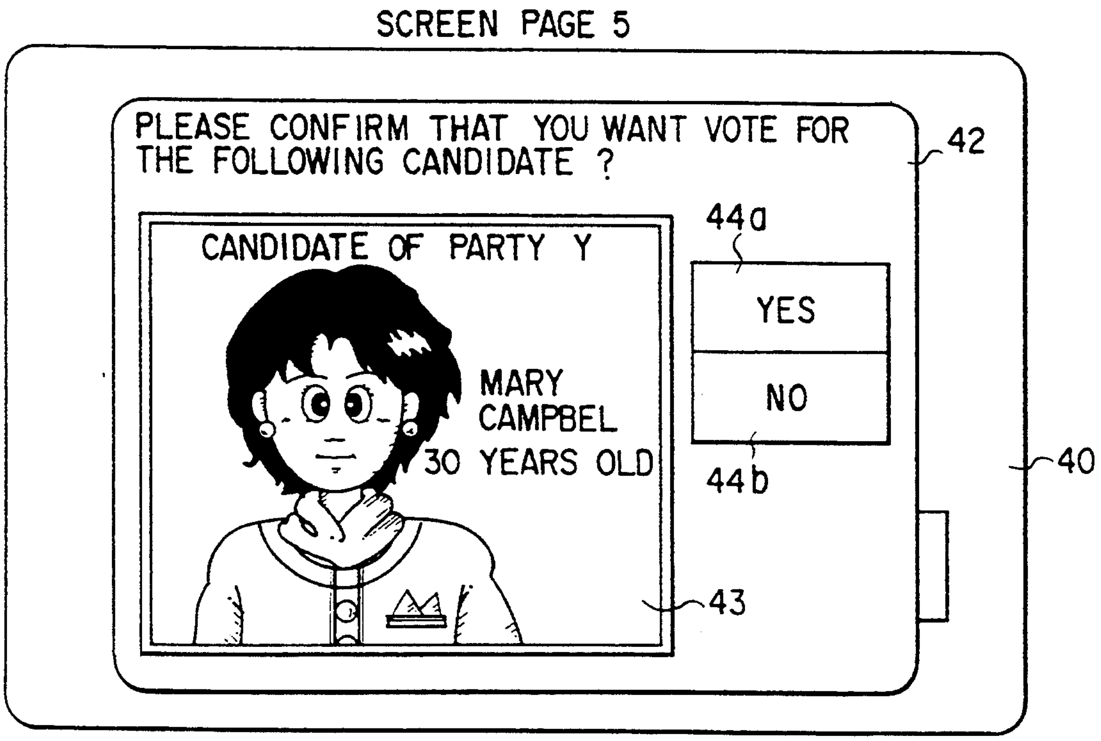

If the voter selects "VOTING BY HANDWRITING" on the screen shown in FIG. 9, the screen shown in FIG. 12 is displayed. As shown in FIG. 13, the voter then writes the candidate number of a desired candidate within a displayed frame by using the pen 3. When the writing operation is completed, the voter designates "ENTRY COMPLETION". The screen shown in FIG. 14 is then displayed. If the voter wants to vote for the displayed candidate, he/she selects "YES". With the above operation, the processing of "VOTING BY HANDWRITING" is completed, and the screen shown in FIG. 9 is displayed again. On the other hand, if the voter selects "ENTRY CANCELLATION" on the screen shown in FIG. 13 and "NO" on the screen shown in FIG. 14, the screen shown in FIG. 12 is displayed again to allow the voter to write again.

In order to discriminate the screens (displays) shown in FIGS. 9 to 14, they will be respectively referred to as screen pages 1 to 5 hereinafter.

Figure 5:
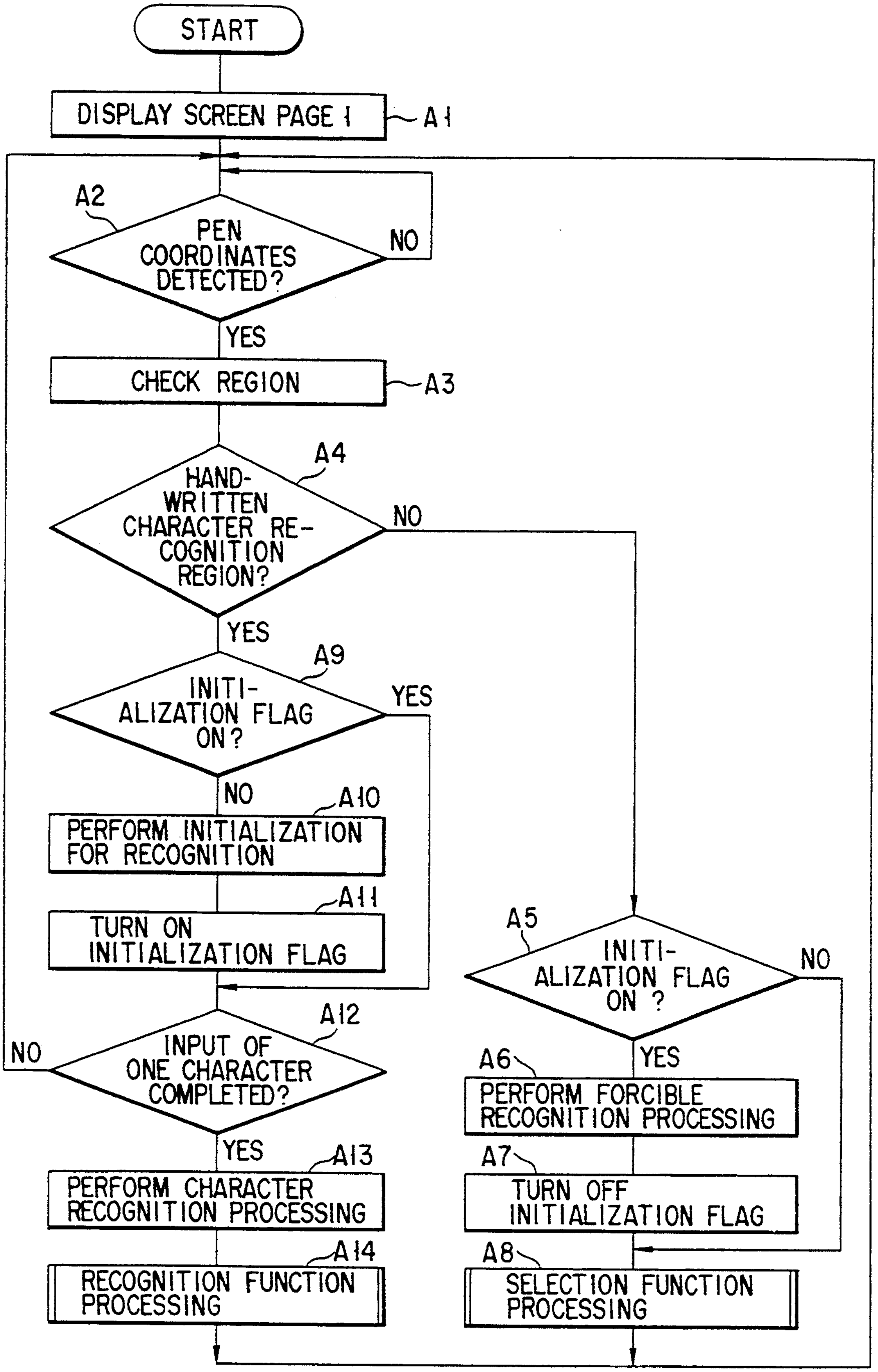
FIG. 5 is a flow chart for explaining the flow of voting processing.
Figure 6A:
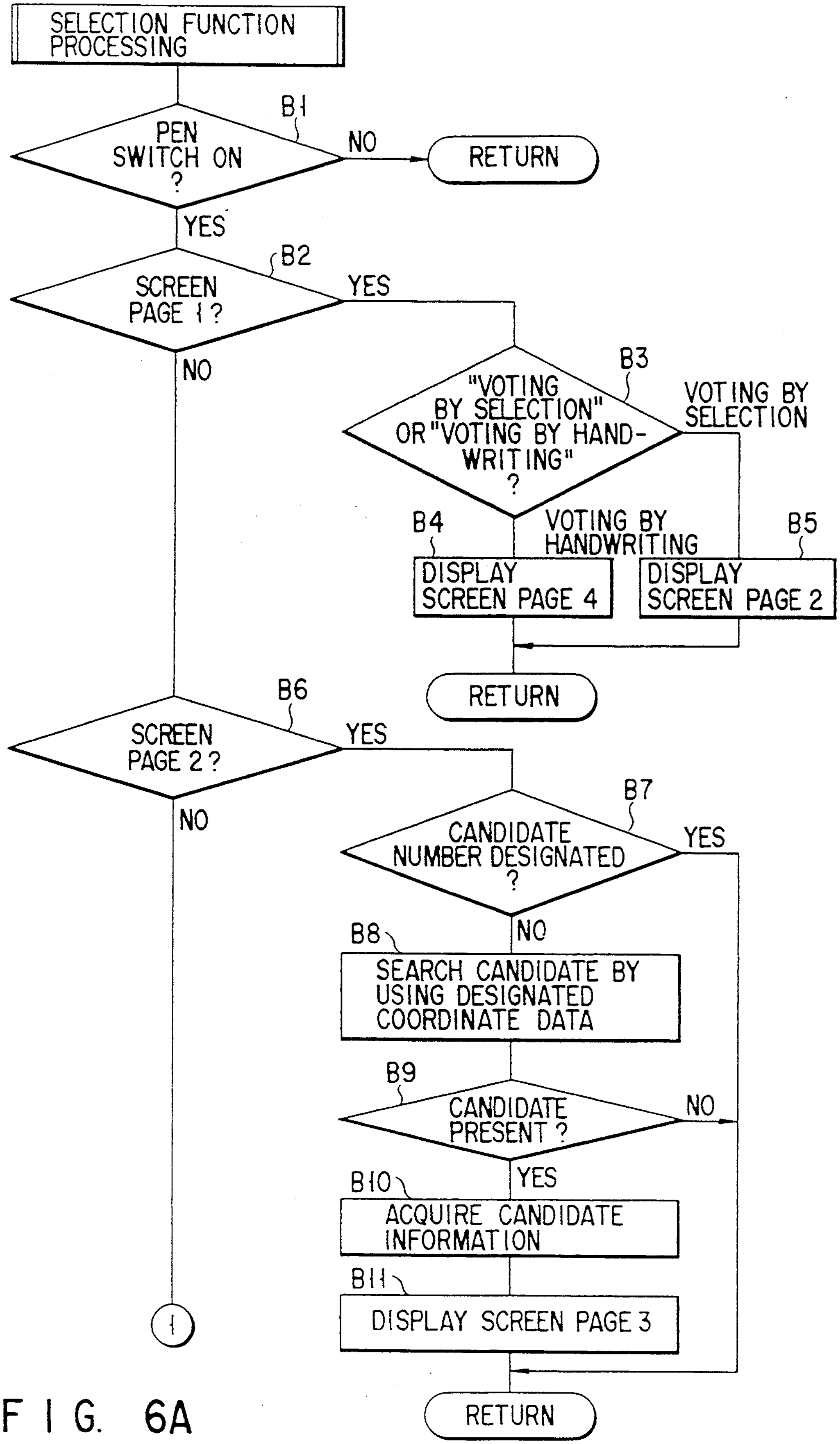
FIGS. 6A and 6B are flow charts showing selection function processing in FIG. 5.
Figure 6B:
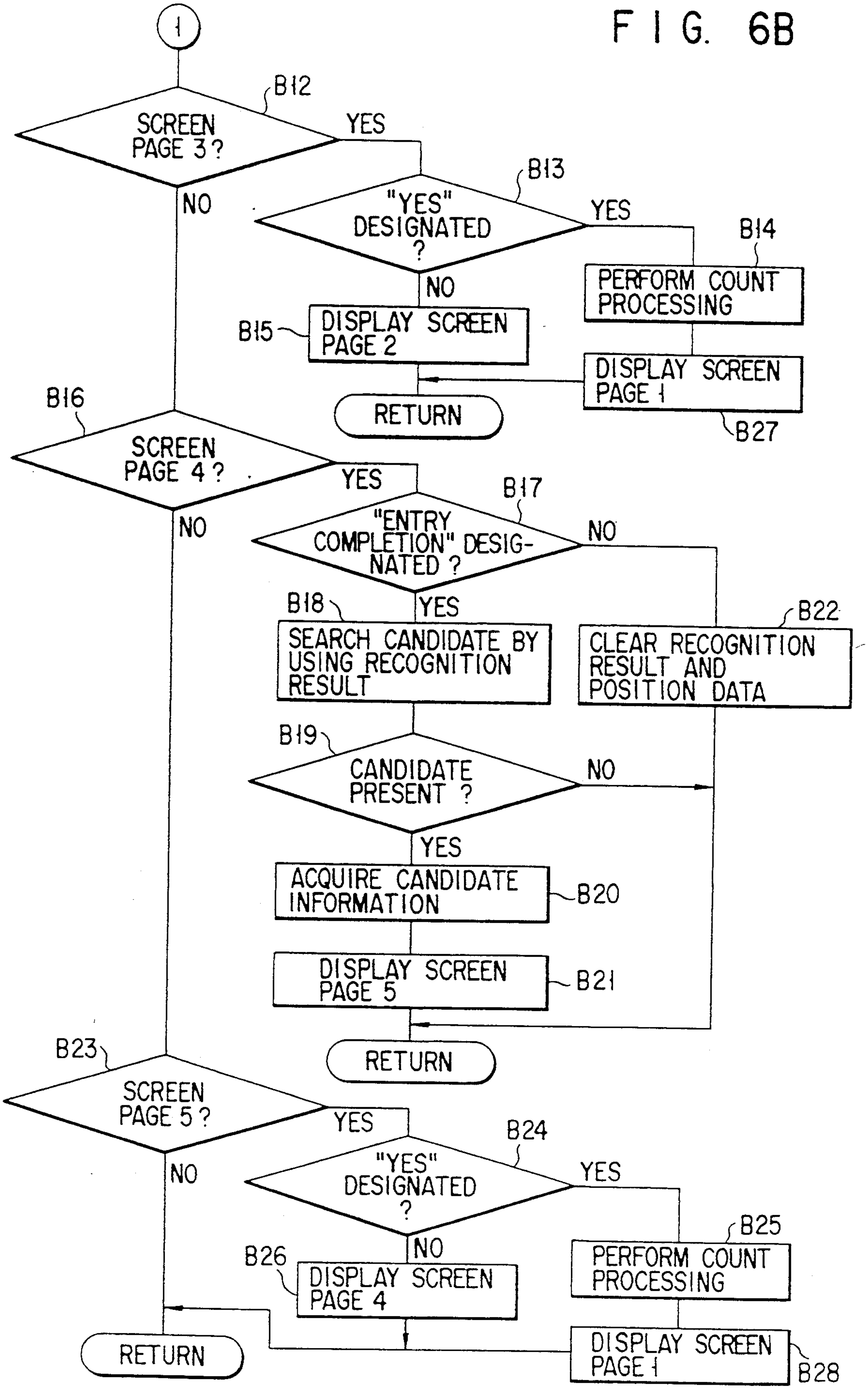
Figure 7:
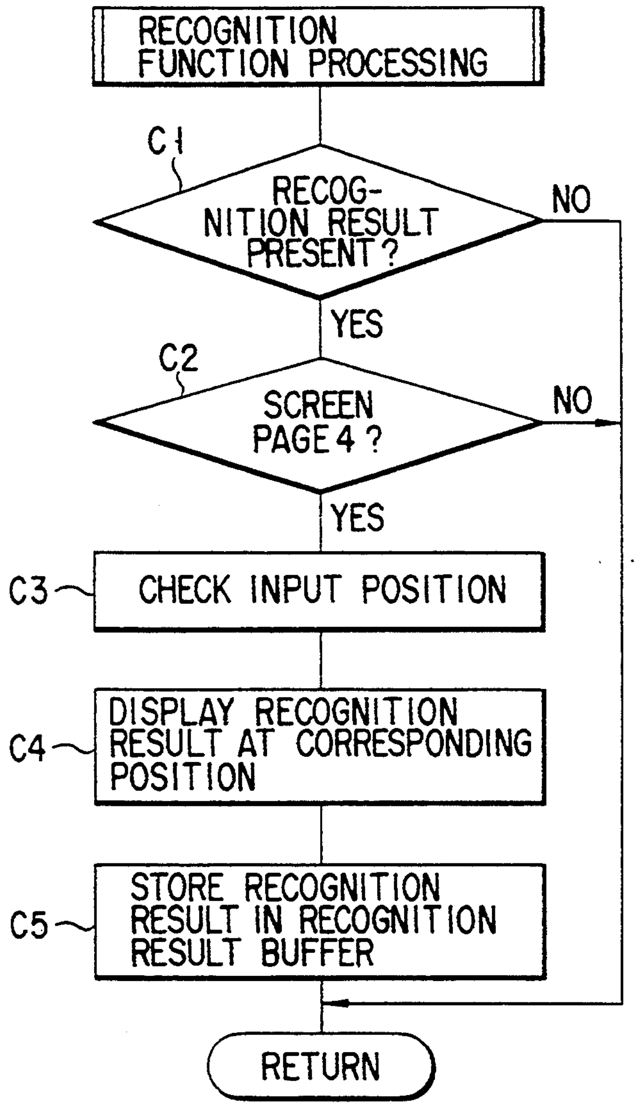
FIG. 7 is a flow chart showing recognition function processing in FIG. 5.

An operation of the election terminal apparatus for enabling the above voting operation will be described in detail below with reference to FIGS. 5 to 7 showing flow charts, and FIGS. 9 to 14.

When the power switch of the election terminal apparatus is turned on, the system is initialized first. Then, a test for checking the operation of each component of the election terminal apparatus is executed. If normal operations are confirmed, the election application program stored in the memory card 19 is transferred to the RAM 13 through the memory card interface 18.

Subsequently, the election application program transferred to the RAM 13 is started, and the flow chart shown in FIG. 5 is started. The display control section 25a supplies display data, which is used to display an initial screen (screen page 1 in FIG. 9) stored in the screen page output buffer 32, to the LCD 6 through the LCD controller 11, thus causing the LCD 6 to display screen page 1 (FIG. 9) (step A1). Subsequently, the election terminal apparatus waits for a voter to input data (step A2).

When a voter is to vote by using the election terminal apparatus, he/she starts to operate the apparatus from the state in which this initial screen is displayed.

Before a voter votes by using the election terminal apparatus, it is necessary to check whether the voter is eligible and has already voted. The eligibility of the voter is determined by the eligibility check section 22 in FIG. 3. For example, determination of eligibility is performed as follows. ID numbers are assigned to the respective voters, and the ID numbers are registered in the election terminal apparatus in advance. A voter inputs his/her ID number to the election terminal apparatus before voting. The eligibility check section 22 checks whether the input ID number coincides with one of the registered ID numbers. The eligibility check section 22 further checks whether the voter having this ID number has already voted. If the input ID number coincides with one of the registered ID numbers, and the voter having the ID number has not voted yet, the eligibility of the voter is determined. If the eligibility check section 22 determines that the voter is non-eligible, the section 22 inhibits a candidate list from being displayed, and outputs a command for invalidating the terminal operation of the voter to the CPU 12. The CPU 12 may inform the presence of a non-eligible voter to the attendants and the like through a buzzer or the speech output unit 33.

when a voter who is recognized as an eligible voter designates the "VOTING BY SELECTION" region 40*a* or the "VOTING BY HANDWRITING" region 40*b* in accordance with a guidance displayed on the initial screen (screen page 1 in FIG. 9) by using the pen 3, the tablet 5 detects the corresponding coordinates (step A2).

The input control section 21 checks a region, on the initial screen (FIG. 9), to which the detected coordinates belong (step A3). As described above, this operation is performed by using screen information registered in the region data buffer 29. More specifically, as shown in FIG. 8, the following pieces of region information are stored in the region data buffer 29 in units of icons of screen pages 1 to 5: region data (the coordinates of the upper left corner and lower right corner of each icon) indicating the display range of each icon, the attribute of each region, the destination for each processing, and the like. The input control section 21 compares the detected coordinates with the region data to discriminate which icon is designated. Assume that the voter designates the "VOTING BY SELECTION" region 40*a* on screen page 1 (FIG. 9) by using the pen 3. In this case, the input control section 21 compares detected coordinate data x and y with the region data, of screen page 1, stored in the region data buffer 29, and detects that $X01>x>X02$ and $Y02>y>Y01$, thus determining that the "VOTING BY SELECTION" region 40*a* is designated.

In step A4, it is checked whether the detected coordinates are located inside a handwritten character recognition region. This handwritten character recognition region corresponds to a region 45 on screen page 4 shown in FIG. 12.

Since the handwritten character recognition region is not present while screen page 1 is displayed, the flow advances to step A5. In step A5, it is checked whether an initialization flag of recognition processing is ON. This initialization flag is set in step A10 (to be described later) when handwritten character recognition processing is started. The initialization flag is normally turned off upon completion of recognition processing. Therefore, the flow normally jumps from step A5 to step A8. If, however, the initialization flag is kept ON for some reason, recognition processing is forcibly executed in step A6 to perform processing as if recognition is performed. Thereafter, the initialization flag is turned off in step A7, and the flow advances to step A8.

The selection function processing in step A8 will be described below with reference to FIGS. 6A and 6B and FIGS. 9 to 14.

In step B1 in FIG. 6A, it is checked whether the switch (to be referred to as a stylus switch hereinafter) in the pen 3 is ON. If YES in step B1, the flow advances to step B2. Otherwise, the flow returns to step A2.

In step B2, it is checked whether the display screen is screen page 1. Since YES is obtained in step B2, the flow advances to step B3.

In step B3, it is checked on the basis of the determination result in step A3 whether the "VOTING BY SELECTION" region 40*a* or the "VOTING BY HANDWRITING" region 40*b* is designated by the pen 3. If, for example, it is detected that the "VOTING BY SELECTION" region 40*a* is designated, the flow advances to step B5. In step B5, the display control section 25*a* supplies display data, used for screen page 2 (FIG. 10) and stored in the screen page output buffer 32, to the LCD 6, thus causing the LCD 6 to display screen page 2. Thereafter, the flow returns to step A2 to wait for the next input. If it is determined in step B3 that the "VOTING BY HANDWRITING" region 40*b* is designated, the flow advances to step B4. In step B4, the display control section 25*a* supplies display data, used for screen page 4 (FIG. 12) and stored in the screen page output buffer 32, to the LCD 6, thus causing the LCD 6 to display screen page 4. The flow then returns to step A2.

When screen page 2 (FIG. 10) is displayed on the LCD 6 in step B5, the voter designates the candidate number of a desired candidate by using the pen 3. Since the region of the candidate number is not "HANDWRITTEN CHARACTER RECOGNITION REGION", the flow advances from step A4 to step A5. In this case, since the initialization flag is OFF, the flow jumps from step A5 to step B8.

In step B6, if it is detected that the display screen is screen page 2, the flow advances to step B7. In step B7, it is checked on the basis of the region check in step A3 whether a region in which a candidate number is displayed is designated. If YES in step B7, the flow advances to step B8. If NO in step B8, the flow returns to step A2. At this time, an error message may be displayed.

In step B8, the candidate number corresponding to the designated coordinate is specified on the basis of the detected coordinate data. That is, the region data for screen page 2 in the region data buffer 29 is searched by using the detected coordinate data so as to obtain the designated registered candidate number. If no registered candidate number corresponding to the detected coordinate data is present, the absence of this number is detected in step B9, and the flow returns to step A2. In this case, an error message may be displayed.

If the registered candidate number is obtained in step B8, the search section 24 searches the candidate buffer 31 by using the number to acquire candidate information corresponding to the number (step B10).

The display control section 25*a* displays a candidate information screen 43 based on the acquired candidate information (name, age, party name, image data for a photograph, and the like) and a pop up screen 42 while superposing the two screens (FIG. 11). Thereafter, the flow returns to step A2 to wait for the next input.

When the voter confirms that the candidate displayed on the candidate information screen 43 is the one whom he/she supports, he/she designates a "YES" region 44*a* with the pen 3. The flow then advances to step B13 through steps A2 to A5, B1, B2, B6, and B12. In step B13, it is detected on the basis of the region check in step A3 that the "YES" region 44*a* is designated. The flow then advances to step B14. In step B14, the search section 24 adds "1" to the value held in a count buffer 318 (a to n) corresponding to the candidate to whom the vote is cast. In this manner, every time a vote is cast, the vote count of a corresponding candidate is updated. With this operation, the voting processing is completed. Control is performed to display the initial screen (screen page 1) (step B27), and the flow returns to step A2 to wait for the next voter to input data.

On the other hand, if the voter confirms that the candidate displayed on the candidate information screen 43 is not the one whom he/she supports, he/she designates a "NO" region 44*b* with the pen 3. The flow then advances to step B15 through steps A2 to A5, B1, B2, B6, B12, and B13. In step B15, screen page 2 (FIG. 10) is displayed to allow the voter to select a candidate, and the flow returns to step A2.

Assume that the voter designates the "VOTING BY HANDWRITING" region 40*b* on the initial screen (screen page 1 in FIG. 9) by using the pen 3. In this case, the flow advances to step B4 through steps A2 to A5, (A6, A7), and B1 to B3. In step B4, the display control section 25*a* transfers the display data, used for screen page 4 (FIG. 12) and stored in the screen page output buffer 32, to the LCD 6, thus causing the LCD 6 to display screen page 4. Thereafter, the flow returns to step A2.

The voter writes the registered candidate number of a desired candidate on the candidate number entry region 45 in FIG. 12 by using the pen 3. This operation is detected in step A2, and the flow advances to step A9 through steps A3 and A4. In step A9, it is checked whether an initialization flag is set. This initialization flag is a flag which is set when the voter starts to write a character in the candidate number entry region 45, and is reset when recognition of the written character is completed. Since the initialization flag is not set at first, initialization processing for character recognition is executed in step A10, and the initialization flag is set in step All.

It is then checked whether writing of one character is completed. While the voter is writing a character, a routine of steps A2, A3, A4, A9, and A12 is repeatedly executed, and the input control section 21 stores coordinate data representing the trace of the pen 3 in the position data buffer 27. During this period, the trace of the pen 3 is displayed by the display control section 25*a* in real time.

If it is determined in step A12 that writing of one character is completed, the recognition processing section 23 recognizes the written character (numeral) by referring to the coordinate data stored in the position data buffer 27 and the dictionary data held in the dictionary data buffer 28 (step A13). Since this character recognition technique itself is a known technique, a description thereof will be omitted. When recognition of the character is completed, the initialization flag is turned off.

After character recognition is performed in step A13, the flow advances to step A14 to perform recognition function processing. The contents of this recognition function processing will be described below with reference to FIG. 7. In step C1, it is checked whether a recognition result is obtained. In step C2, it is checked whether the screen displayed on the LCD 6 is screen page 4 (FIG. 12). If NO in either step C1 or step C2, the flow returns to step A2.

If the display screen is screen page 4 and a character recognition result is present, the input position (one of the two frames in the candidate number entry region 45) is checked in step C3. This check is executed by the recognition processing section 23 by referring to the position data buffer 27. The recognition result is then displayed at the position obtained in step C3 (step C4). In addition, the recognition processing section 23 stores the recognition result in the recognition result buffer 30 (step C5). The flow returns to step A2.

The voter writes a character in the remaining frame in the same manner as described above. FIG. 13 shows a state wherein the recognized character "1" is displayed in the left frame, and the handwritten character "0" before recognition processing is written in the right frame. When recognition and display of the two characters are completed, the voter checks the characters displayed in the candidate number entry region 45, and designates an "ENTRY COMPLETION" region **46*b* or "ENTRY CANCELLATION" region 46*a* by operating the pen 3**.

This operation is detected in step A2, and the flow advances to step B17 through steps A3 to A5, B1 to B3, B12, and B16. In step B17, it is checked whether the "ENTRY COMPLETION" region **46*b* or the "ENTRY CANCELLATION" region 46*a*** is designated.

If the "ENTRY COMPLETION" region **46*b* is designated, the flow advances to step B18. In steps B18 to B20, similar to steps in B8 to B10, processing for acquiring information associated with the selected candidate is executed. Note that this processing is different from that in steps B8 to B10 in that the search section 24 searches the candidate buffer 31** on the basis of the registered candidate number obtained by the character recognition processing.

when the information associated with the candidate is acquired, the display control section **25*a* transfers display data, used for screen page 5 (FIG. 14) and stored in the screen page output buffer 32, to the LCD 6, thus causing the LCD 6** to display screen page 5, in step B21. Thereafter, the flow returns to step A2.

On the other hand, if it is determined in step B17 that the "ENTRY CANCELLATION" region **46*a*** is designated, the flow advances to step B22. In step B22, the recognition result and the position data are cleared to set a state which allows recognition of handwritten characters again. Thereafter, the flow returns to step A2.

When screen page 5 (FIG. 14) is displayed on the LCD 6 in step B21, the voter checks whether the candidate displayed on the candidate information screen 43 is the one whom he/she supports. If the displayed candidate is the right one, the voter designates the "YES" region **44*a* by using the pen 3. The flow then advances to step B24 through steps A2 to A5, B1, B2, B6, B12, B16, and B23. In step B24, it is detected on the basis of the region check in step A3 that the "YES" region 44*a* is designated. The flow then advances to step B25. In step B25, the search section 24 adds "1" to the value held in the count buffer 318** (a to n) corresponding to the candidate to whom the vote is cast. With the above operation, the voting processing is completed. Control is performed to display the initial screen (screen page 1) (step B28), and the flow returns to step A2 to wait for the next voter to input data.

On the other hand, if the displayed candidate is not the one whom the voter supports, he/she designates the "NO" region **44*b* by using the pen 3. The flow then advances to step B26 through steps A2 to A5, B1, B2, B6, B12, B16, and B23. In step B26, screen page 4 (FIG. 12**) is displayed to allow the voter to select a candidate. Thereafter, the flow returns to step A2.

In the above-described manner, voting operations using the election terminal apparatus are executed.

The control operations of the display control section **25*a* and the speech control section 25*b* will be described below with reference to FIGS. 15A, 15B, and 16**.

Figure 15A:
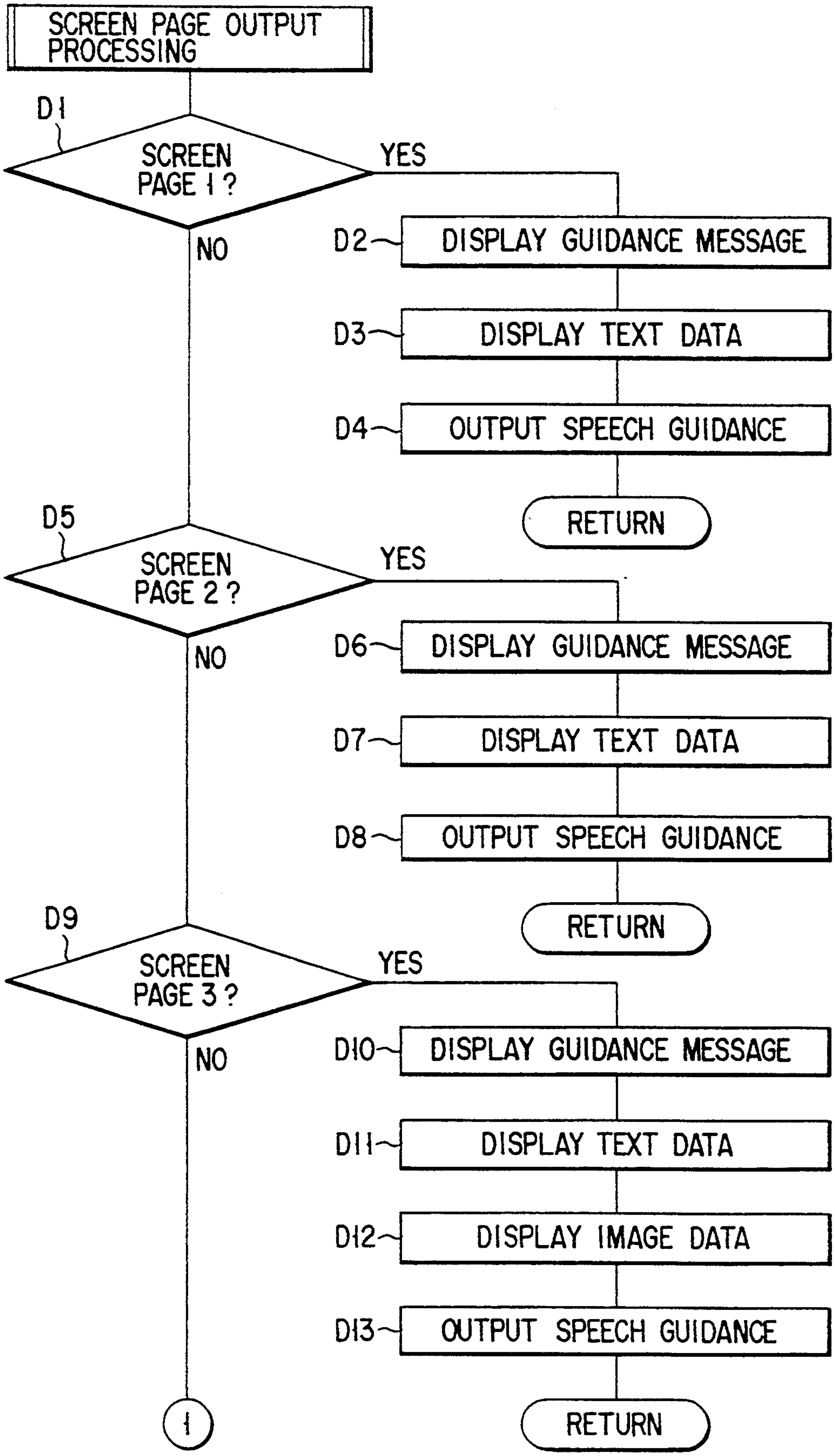
FIGS. 15A and 15B are flow charts showing a procedure for screen page output processing.
Figure 15B:
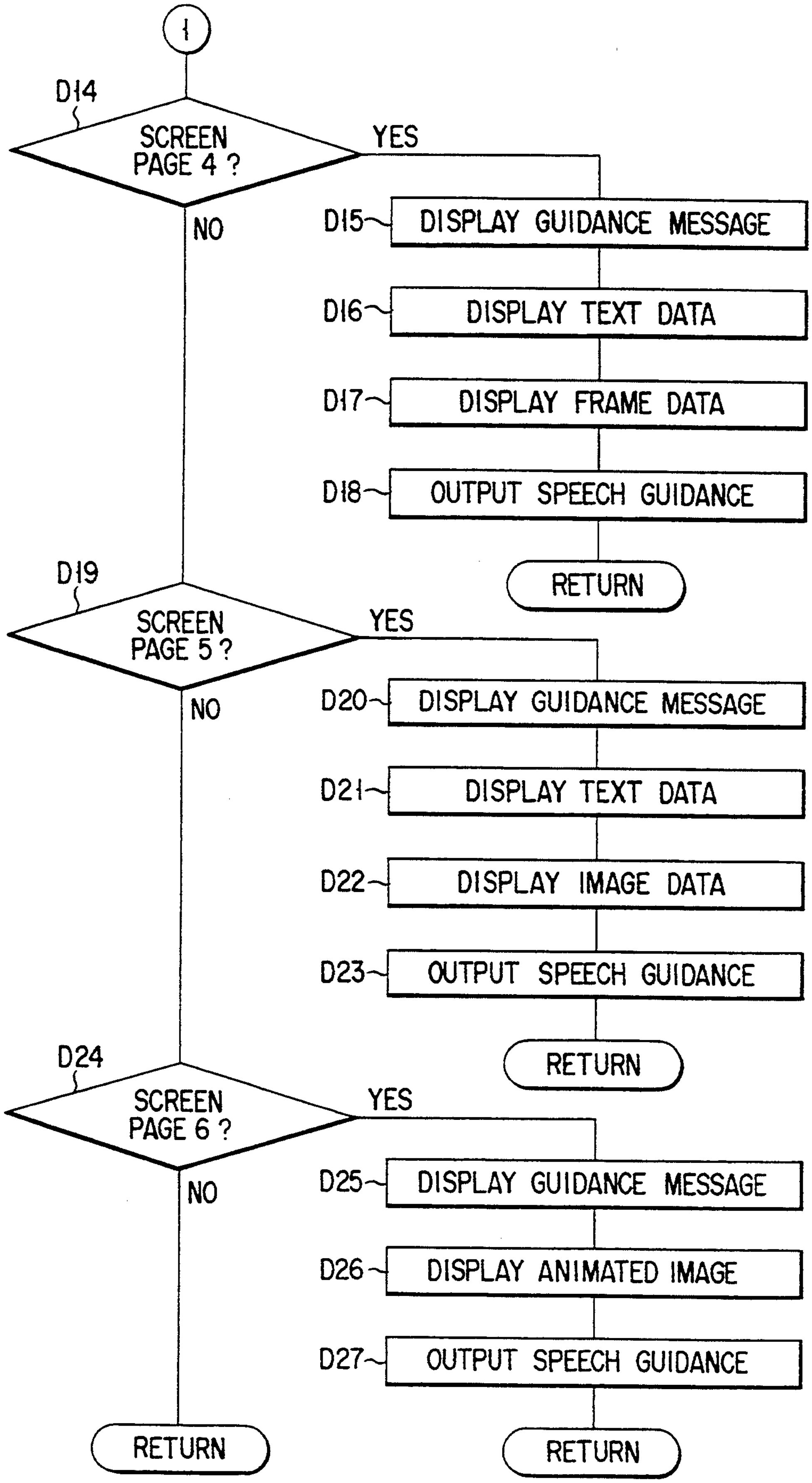

Steps D1, D5, D9, D14, and D19 shown in FIGS. 15A and 15B correspond to steps B2, B6, B12, B16, and B23 shown in FIGS. 5A and 5B, in which the page number of the display screen is determined. As shown in FIG. 16, guidance data, text data, and speech guidance data are stored in the screen page output buffer 32 in correspondence with the respective screen pages. Note that the display address data of guidance data, text data, image data, and the like, i.e., addresses on the LCD 6, are omitted from FIG. 16.

If, for example, it is determined in step D1 that the current display screen is screen page 1, the display control section **25*a* causes the LCD 6 to display guidance data "PLEASE DESIGNATE ONE OF VOTING MODES WITH ATTACHED PEN", which data is used for screen page 1 and stored in the screen page output buffer 32 (step D2). In addition, the display control section 25*a* causes the LCD 6 to display text data "VOTING BY SELECTION" and "VOTING BY HANDWRITING" (step D3). With this operation, the display shown in FIG. 9** is displayed.

Meanwhile, the speech control section **25*b* reads out speech guidance data "PLEASE DESIGNATE ONE OF VOTING MODES WITH ATTACHED PEN" from the screen page output buffer 32, and controls the speech output unit 33** to output the data by speech (step D4).

Similarly, in step D5, displaying of guidance and text data and outputting of speech guidance data as speech are performed in correspondence with screen page 2 (steps D6 to D8). In this case, it would be kind to voters if, for example, the names of candidates are output by speech together with registered numbers.

Similarly, in step D9, guidance data, text data, and image data are displayed, while speech guidance data is output by speech, in correspondence with screen page 3 (steps D10 to D13). Similarly, in step D14, guidance data, frame data, text data, and image data are displayed, while speech guidance data is output by speech, in correspondence with screen page 4 (steps D15 to D18). Similarly, in step D19, guidance data, text data, and image data are displayed, while speech guidance data is output by speech, in correspondence with screen page 5 (steps D20 to D23).

Note that after it is detected in steps B13 and B24 in FIGS. 5A and 5B that the "YES" region 44*a* is designated, count processing in steps B14 and B25 may be performed while completion of the voting processing is displayed by characters, speech, and animation (screen page 6), and screen page 1 may be subsequently displayed. In steps D24 to D27, processing for displaying screen page 6 is performed.

By combining the display control section 25*a* and the speech control section 25*b* in this manner, an election terminal apparatus with high operability can be provided to voters.

Figure 17:
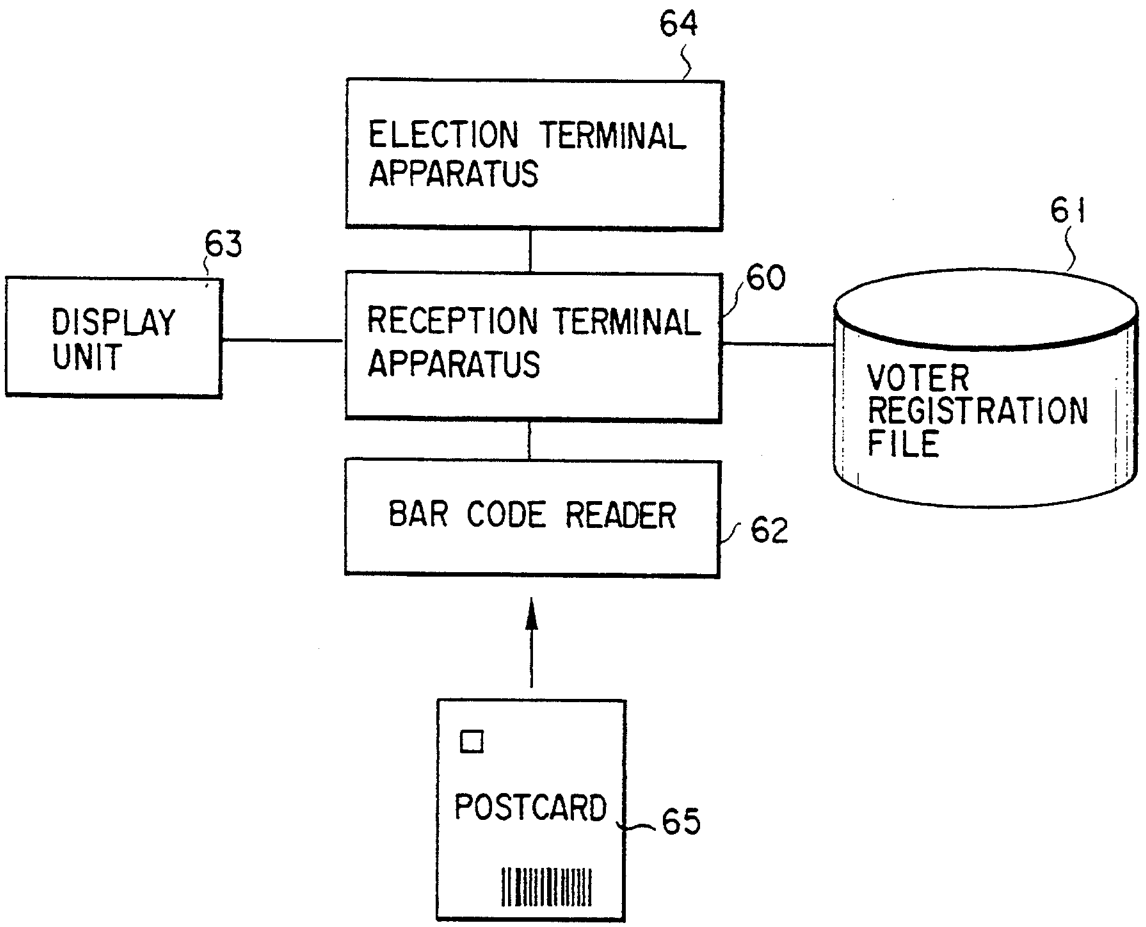
FIG. 17 is a block diagram showing the arrangement of a reception terminal apparatus for determining the eligibility of a voter.

In the above embodiment, the election terminal apparatus includes the mechanism for determining the eligibility of each voter. However, a reception terminal unit may be arranged as a mechanism for determining the eligibility of each voter, as shown in FIG. 17. Referring to FIG. 17, a voter registration file 61, a bar code reader 62, and a display unit 63 are connected to a reception terminal apparatus 60. In the voter registration file 61, voter information (e.g., the number, address, name, and date of birth of each voter) associated with each voter who is to vote in the polling station where the apparatus is installed is registered. In this embodiment, reception postcards for a polling station are mailed or distributed to the respective voters before an election day. Information for identifying each voter (e.g., voter number) is appended to such a postcard. The bar code reader 62 reads a bar code 65 on this reception postcard and outputs the read information to the reception terminal apparatus 60. If the bar code reader 62 cannot read the bar code for some reason, e.g., a stain on the bar code, or the voter lost his/her reception postcard, the identification information is input to the reception terminal apparatus 60. If through another input unit such as a keyboard or a tablet.

The reception terminal apparatus 60 searches the voter registration file 61 on the basis of the identification information obtained from the bar code reader 62 or another input unit such as a keyboard or a tablet, and outputs the corresponding voter information to the display unit 63. When an attendant in the polling station confirms from the voter information displayed on the display unit 63 that the corresponding person has the right to vote at the polling station, he/she performs a confirming operation. In response to this confirming operation, the reception terminal apparatus 60 sets a reception completion flag in the corresponding voter file in the voter registration file 61. With this operation, the reception terminal apparatus 60 can check a voter to prevent him/her from non-eligible voting (voting twice). In addition, the reception terminal apparatus 60 allows an eligible voter to vote by using an election terminal apparatus 64.

Note that the election terminal apparatus 64 and the reception terminal apparatus 60 may be connected by an on-line scheme so that when the reception terminal apparatus 60 confirms the eligibility of a voter, the apparatus 60 sends a signal to the election terminal apparatus 64 to automatically activate the election terminal apparatus 64. In addition, ID cards or the like may be used in place of reception postcards with bar codes.

Figure 18:
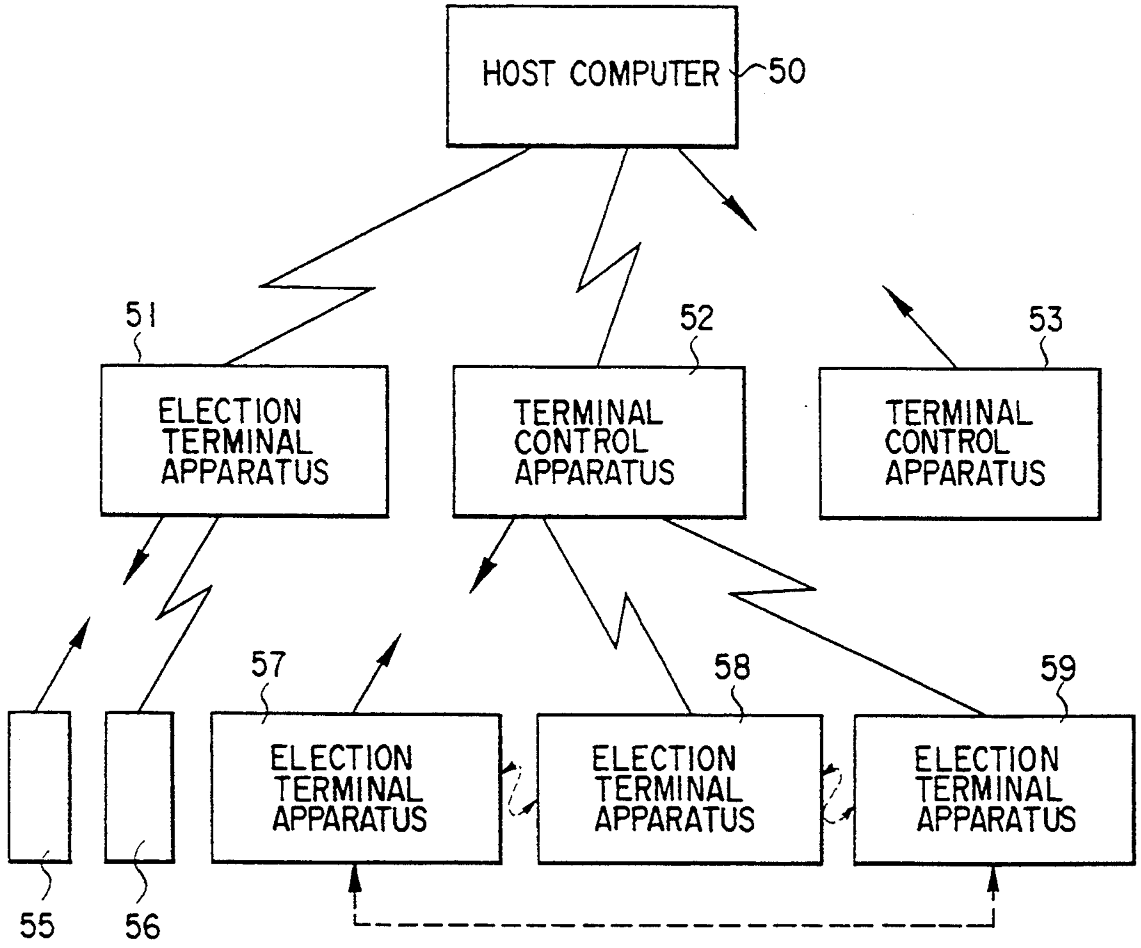
FIG. 18 is a block diagram showing the arrangement of an election computer system.

FIG. 18 shows a voting/totaling system constituted by election terminal apparatuses according to the present invention. One or a plurality of election terminal apparatuses 57 to 59 are installed in each polling station. Vote count data of each candidate, stored in a corresponding one of vote count buffers 318*a* to 318*n* of each election terminal apparatus, is transmitted to a terminal control apparatus 52 through a communication interface 16 by wire or radio. For example, the terminal control apparatus 52 is installed in each special area. The terminal control apparatus 52 receives vote count data stored in the respective election terminal apparatuses and totals the vote count data in units of candidates. In addition, the vote count data totaled by the terminal control apparatus 52 are transmitted to a host computer 50 by wire or radio. The host computer 50 totals the vote count data transmitted from terminal control apparatuses 52 and 53 or election terminal apparatuses 51.

In addition, for example, a terminal control function may be added to each election terminal apparatus 51, and a plurality of election terminal apparatuses may be connected to each other by wire or radio, as indicated by a broken line in FIG. 18, so that vote count data are transferred to each other to total the vote count data. Furthermore, a voting processing function may be added to the terminal control apparatus 53, and the apparatus 53 may be directly connected to the host computer 50 to control data transfer.

The present invention is not limited to the above-described embodiments. Various changes and modifications can be made within the spirit and scope of the invention. For example, symbols representing candidates (e.g., images of animals and plants) may be used in place of photographic image data of candidates. In addition, in FIG. 10, instead of displaying the registered numbers of candidates, the candidate names may be directly displayed. Similarly, in FIG. 12, instead of handwriting the number of a candidate, the candidate name be handwritten. Moreover, a party name or the like may be directly or indirectly displayed instead of a candidate name depending on the type of election.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic voting system comprising:

at least one election terminal apparatus incorporating a storage unit and using a coordinate input unit and a display unit interlocked therewith comprising:

(a) means for displaying a list of candidate information on said display unit and urging a voter to perform a selecting operation;

(b) means for, when the voter selects a candidate information by using said coordinate input unit, displaying an attribute of the selected candidate information, and urging the voter to perform a confirming operation for a final decision to vote for the candidate information whose attribute is displayed; and (c) means for, when a confirming operation is performed by the voter, registering a vote count.

2. The system according to claim 1, wherein the at least one election terminal apparatus further comprising means, connected to said means for urging the voter, for checking eligibility of a voter; and means for disabling said means for urging the voter to perform a confirming operation if a check result from said checking means indicates that the voter has no eligibility.

3. The system according to claim 1, wherein said displayed attribute of the selected candidate information is a photograph of a selected candidate corresponding to the selected candidate information.

4. The system according to claim 1, wherein said displayed attribute of the selected candidate information is a symbol representing a selected candidate corresponding to the selected candidate information.

5. The system according to claim 1, wherein said displayed attribute of the selected candidate information includes a candidate name, a party name to which the candidate belongs and an age of the candidate, corresponding to the selected candidate information and which are serving as identifying the candidate.

6. The system according to claim 1, wherein the at least one election terminal apparatus comprises a plurality of identical election terminal apparatuses, and each election terminal apparatus having transmission means for transmitting the registered vote count; and the system further comprising a terminal control apparatus, connected between each of said election terminal apparatuses and a host computer, for managing each of said election terminal apparatuses, said terminal control apparatus receiving and totaling vote count data respectively registered by said plurality of election terminal apparatuses.

7. The system according to claim 6, wherein the vote count data totaled by said terminal control apparatus is transferred to the host computer.

8. The system according to claim 1, wherein the at least one election terminal apparatus comprises a plurality of identical election terminal apparatuses connected to each other and each comprising transmission means for transmitting the registered vote count, and one of the plurality of election terminal apparatuses serving as a master apparatus of said election terminal apparatuses, and the master apparatus receives and totals vote count data respectively registered by said plurality of election terminal apparatuses.

9. An apparatus according to claim 8, wherein the master apparatus includes a transmission function and the vote count data totaled by the master apparatus are transferred to a host computer.

10. The electronic voting system according to claim 1, wherein the candidate information comprises a name of the candidate.

11. The electronic voting system according to claim 10, wherein the candidate information further comprises a party of the candidate.

12. The electronic voting system according to claim 1, wherein the candidate information comprises a party of a candidate.

13. The electronic voting system according to claim 1, wherein the vote count is registered in said storage unit.

14. The electronic voting system according to claim 1, wherein the vote count is registered in a host computer connected to the storage unit.

15. A vote input terminal apparatus, comprising:

means for determining on the basis of input information for identifying a voter whether the voter has the right to vote;

voting permission means for permitting voting when said determining means determines that the voter has the right to vote;

first display means for displaying a list of candidates when said voting permission means permits the voting;

first designating means for selecting one of the candidates displayed by said first display means;

second display means for displaying information about the candidate selected by said first designating means;

second designating means for confirming a voting operation with respect to the candidate displayed by said second display means; and means for storing vote information input by said second designating means.

16. An apparatus according to claim 15, wherein said second display means displays at least a candidate name, party name, an age, and a photographic image of a face of the candidate selected by said first designating means.

17. The apparatus according to claim 15, wherein said first display means, said first designating means, said second display means, and said second designating means comprise a pen input/display unit having a tablet and a display integrated into one unit, and including means for designating a position on said tablet, means for detecting the designated position, and display control means for controlling said display.

18. A vote input terminal apparatus, comprising:

means for determining on the basis of input information for identifying a voter whether the voter has the right to vote;

vote permission means for permitting voting when said determining means determines that the voter has the right to vote;

first display means for displaying a list of candidates when said vote permission means permits the voting;

first designating means for selecting one of the candidates displayed by said first display means on the basis of a recognition result obtained by said recognition means;

second display means for displaying information about the candidate selected by said first designating means;

second designating means for confirming a voting operation with respect to the candidate displayed by said second display means; and means for storing vote information input by said second designating means.

19. An apparatus according to claim 18, wherein said second display means displays at least a candidate name, a party name, an age, and a photographic image of a face of the candidate selected by said first designating means.

20. A vote totaling system constituted by at least one election terminal control apparatus having a transmission function, and a host computer connected to said at least one election terminal control apparatus, said vote totaling system comprising:

means for determining on the basis of input information for identifying a voter whether the voter has the right to vote;

vote permission means for permitting voting when said determining means determines that the voter has the right to vote;

first display means for displaying a list of candidates when said vote permission means permits the voting;

first designating means for selecting one of the candidates displayed by said first display means;

second display means for displaying information about the candidate selected by said first designating means;

second designating means for confirming a voting operation with respect to the candidate displayed by said second display means; and means for storing vote information input by said second designating means, wherein said at least one election terminal control apparatus totals pieces of vote information supplied from said second designating means, and transmits the totaled vote information to said host computer.

21. A vote totaling system constituted by at least one election terminal control apparatus having a transmission function, and a host computer connected to said at least one election terminal control apparatus, said vote totaling system comprising:

means for determining on the basis of input information for identifying a voter whether the voter has the right to vote;

vote permission means for permitting voting when said determining means determines that the voter has the right to vote;

first display means for displaying a list of candidates when said vote permission means permits voting;

first designating means for selecting one of the candidates displayed by said first display means on the basis of a recognition result obtained by said recognition means;

second display means for displaying information about the candidate selected by said first designating means;

second designating means for confirming a voting operation with respect to the candidate displayed by said second display means; and means for storing vote information input by said second designating means, wherein said election terminal control apparatus totals pieces of vote information supplied from said second designating means, and transmits the totaled vote information to said host computer.

22. A vote totaling system constituted by at least one election terminal control apparatus having a transmission function to which a plurality of pen input/display units are connected, and a host computer connected to said at least one election terminal control apparatus through a line, each pen input/display unit having a tablet and a display integrated into one unit, and including means for recognizing a character written on said tablet, means for designating a position on said tablet, means for detecting the designated position, and display control means for controlling said display, said vote totaling system comprising:

means for determining on the basis of input information from each pen input/display unit for identifying a voter whether the voter has the right to vote;

vote permission means for permitting voting when said determining means determines that the voter has the right to vote;

means for displaying party names when said vote permission means permits voting;

selection means for selecting, by said position designating means, one of the party names displayed by said first display means on the basis of a recognition result obtained by said recognition means; and means for confirming a voting operation with respect to the party selected by said selection means, wherein said at least one election terminal control apparatus totals pieces of vote information supplied from said plurality of pen input/display units, and transmits the totaled vote information to said host computer.

* * * * *